US009636985B2

(12) United States Patent
Nakagawa

(10) Patent No.: US 9,636,985 B2
(45) Date of Patent: May 2, 2017

(54) FUEL CELL VEHICLE

(71) Applicant: HONDA MOTOR CO., LTD., Tokyo (JP)

(72) Inventor: Satoshi Nakagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/961,888

(22) Filed: Dec. 8, 2015

(65) Prior Publication Data

US 2016/0159211 A1 Jun. 9, 2016

(30) Foreign Application Priority Data

Dec. 9, 2014 (JP) ................................ 2014-249216

(51) Int. Cl.
| | | |
|---|---|---|
| *B60K 16/00* | (2006.01) | |
| *B60K 1/04* | (2006.01) | |
| *B60L 11/18* | (2006.01) | |
| *B62D 25/08* | (2006.01) | |
| *B62D 25/10* | (2006.01) | |

(52) U.S. Cl.
CPC ............ *B60K 1/04* (2013.01); *B60L 11/1881* (2013.01); *B62D 25/081* (2013.01); *B62D 25/105* (2013.01); *B60K 2001/0411* (2013.01); *Y02T 10/7005* (2013.01)

(58) Field of Classification Search
CPC ...... B62D 25/105; B62D 25/081; B60K 1/04; B60K 16/00; B60H 1/00392; B60H 1/00564
See application file for complete search history.

(56) References Cited

U.S. PATENT DOCUMENTS

| | | | | | |
|---|---|---|---|---|---|
| 6,056,075 | A | * | 5/2000 | Kargilis | ............... B62D 25/105 |
| | | | | | 180/68.1 |
| 2003/0178873 | A1 | * | 9/2003 | Kato | .................... B62D 25/081 |
| | | | | | 296/192 |
| 2013/0333965 | A1 | * | 12/2013 | Kobayashi | .......... B60L 11/1896 |
| | | | | | 180/65.31 |

FOREIGN PATENT DOCUMENTS

| | | |
|---|---|---|
| JP | 03-025084 | 2/1991 |
| JP | 05-521 | 1/1993 |
| JP | 2003-034267 | 2/2003 |
| JP | 2004-040950 | 2/2004 |
| JP | 2004-161057 | 6/2004 |

(Continued)

OTHER PUBLICATIONS

Japanese Office Action for corresponding JP Application No. 2014-249216, Dec. 6, 2016.

*Primary Examiner* — Hau Phan
(74) *Attorney, Agent, or Firm* — Mori & Ward, LLP

(57) ABSTRACT

A fuel cell vehicle includes a front compartment, a cowl top, a hood, and a blocking member. The front compartment is provided in front of a dashboard. A fuel cell is disposed in the front compartment. The cowl top is disposed between the front compartment and the dashboard and hermetically sealed from the front compartment via a sealing portion. The front compartment is opened or closed via the hood. The hood includes an outer plate and an inner plate that are joined together to provide an inner passage between the outer plate and the inner plate. The inner passage extends from the front compartment to the cowl top bypassing the sealing portion. The blocking member is disposed in the inner passage to block flow of fluid between the front compartment and the cowl top.

19 Claims, 6 Drawing Sheets

(56) References Cited

FOREIGN PATENT DOCUMENTS

| | | |
|---|---|---|
| JP | 2006-188170 | 7/2006 |
| JP | 2009-018803 | 1/2009 |
| JP | 2013-033676 | 2/2013 |
| JP | 2014-136531 | 7/2014 |
| JP | 2014-151682 | 8/2014 |

* cited by examiner

FUEL CELL VEHICLE

CROSS-REFERENCE TO RELATED APPLICATIONS

The present application claims priority under 35 U.S.C. §119 to Japanese Patent Application No. 2014-249216, filed Dec. 9, 2014, entitled "Fuel Cell Vehicle." The contents of this application are incorporated herein by reference in their entirety.

BACKGROUND

1. Field

The present disclosure relates to a fuel cell vehicle.

2. Description of the Related Art

In general, solid polymer electrolyte fuel cells include a solid polymer electrolyte membrane that is a polymer ion-exchange membrane. The fuel cells include a membrane electrode assembly (MEA), in which an anode electrode is disposed on one side of the solid polymer electrolyte membrane and a cathode electrode is disposed on the other side of the solid polymer electrolyte membrane. Each of the anode electrode and the cathode electrode includes a catalyst layer (electrode catalyst layer) and a gas diffusion layer (porous carbon).

A membrane electrode assembly and a pair of separators (bipolar plates), sandwiching the membrane electrode assembly therebetween, constitute a fuel cell. A fuel cell stack, in which a predetermined number of such fuel cells are stacked, is used, for example, as a vehicle fuel cell stack.

Regarding fuel cell vehicles, a layout in which a fuel cell stack is disposed in a front compartment (motor compartment) of a vehicle, is known. For example, Japanese Unexamined Patent Application Publication No. 2004-40950 discloses a fuel cell automobile in which a closed space, for mounting a fuel cell as a power source of the automobile, is disposed in front of a passenger compartment. At least one of a first opening, which is located above the closed space, and a second opening, which is located at a position where a negative pressure is generated when the automobile is being driven, is provided, so that hydrogen leaked from the fuel cell system into the closed space can be discharged.

It is described that, with this structure, in the case where an opening is provided above the closed space, hydrogen leaked from the fuel cell system into the close space can be reliably discharged to the outside of the automobile, particularly when the automobile is not being driven. It is described that, in the case where an opening is provided at a position where a negative pressure is generated, hydrogen leaked from the fuel cell system when the automobile is being driven can be reliably discharged from the closed space.

SUMMARY

According to one aspect of the present invention, a fuel cell vehicle includes a fuel cell, a cowl top, and a hood. The fuel cell is disposed in a front compartment in front of a dashboard. The cowl top is disposed on the front compartment so as to be hermetically sealed from the front compartment with a sealing portion therebetween. The hood allows the front compartment to be open or closed. The hood includes an outer plate member and an inner plate member that are joined together. An inner passage, which extends from the front compartment to the cowl top beyond the sealing portion, is formed between the outer plate member and the inner plate member. A blocking member, which blocks flow of fluid between the front compartment and the cowl top, is disposed in the inner passage.

According to another aspect of the present invention, a fuel cell vehicle includes a front compartment, a cowl top, a hood, and a blocking member. The front compartment is provided in front of a dashboard. A fuel cell is disposed in the front compartment. The cowl top is disposed between the front compartment and the dashboard and hermetically sealed from the front compartment via a sealing portion. The front compartment is opened or closed via the hood. The hood includes an outer plate and an inner plate that are joined together to provide an inner passage between the outer plate and the inner plate. The inner passage extends from the front compartment to the cowl top bypassing the sealing portion. The blocking member is disposed in the inner passage to block flow of fluid between the front compartment and the cowl top.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
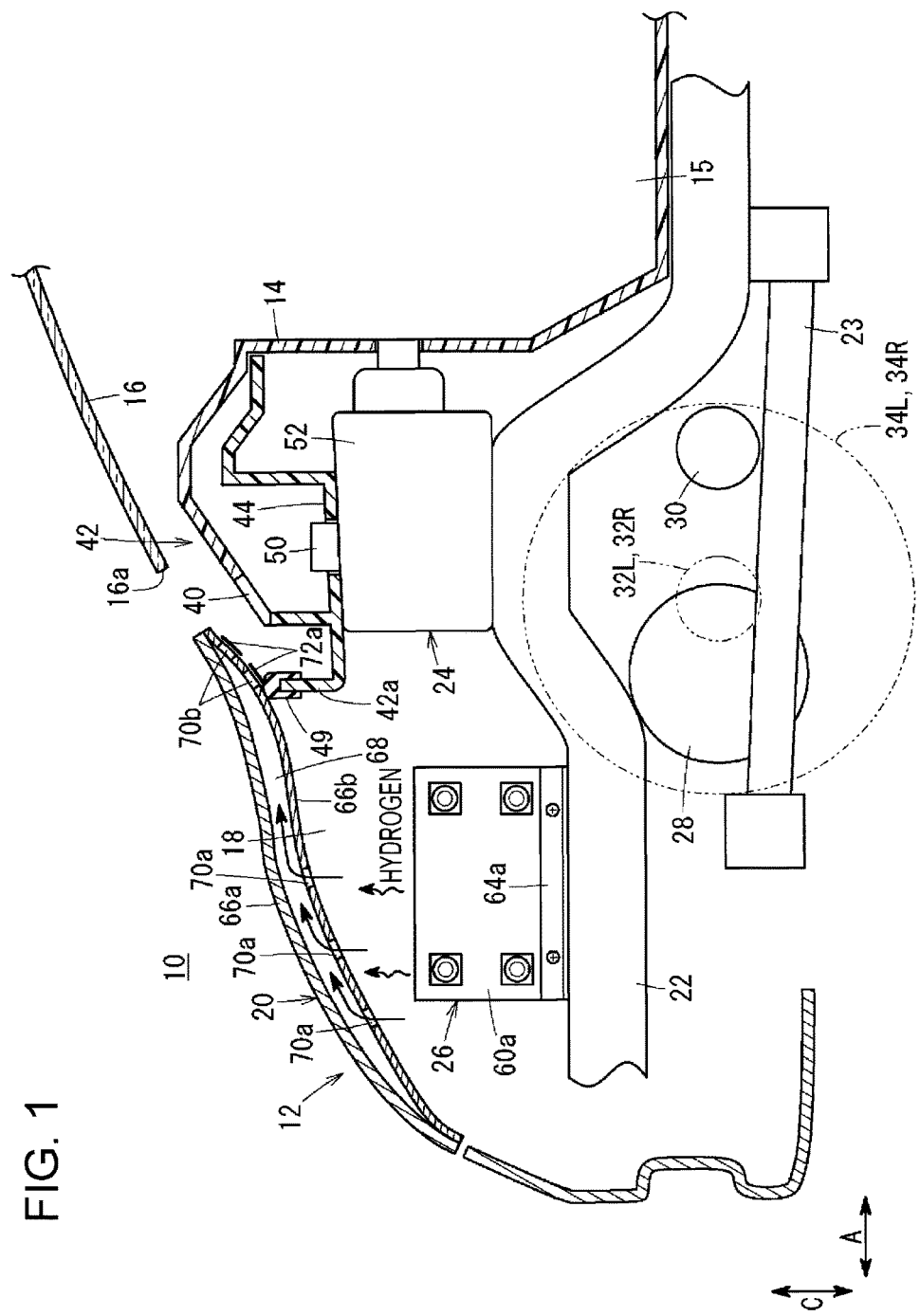
FIG. 1 is a partial schematic side view of a fuel cell electric automobile according to a first embodiment of the present disclosure.

The embodiments will now be described with reference to the accompanying drawings, wherein like reference numerals designate corresponding or identical elements throughout the various drawings.

Figure 2:
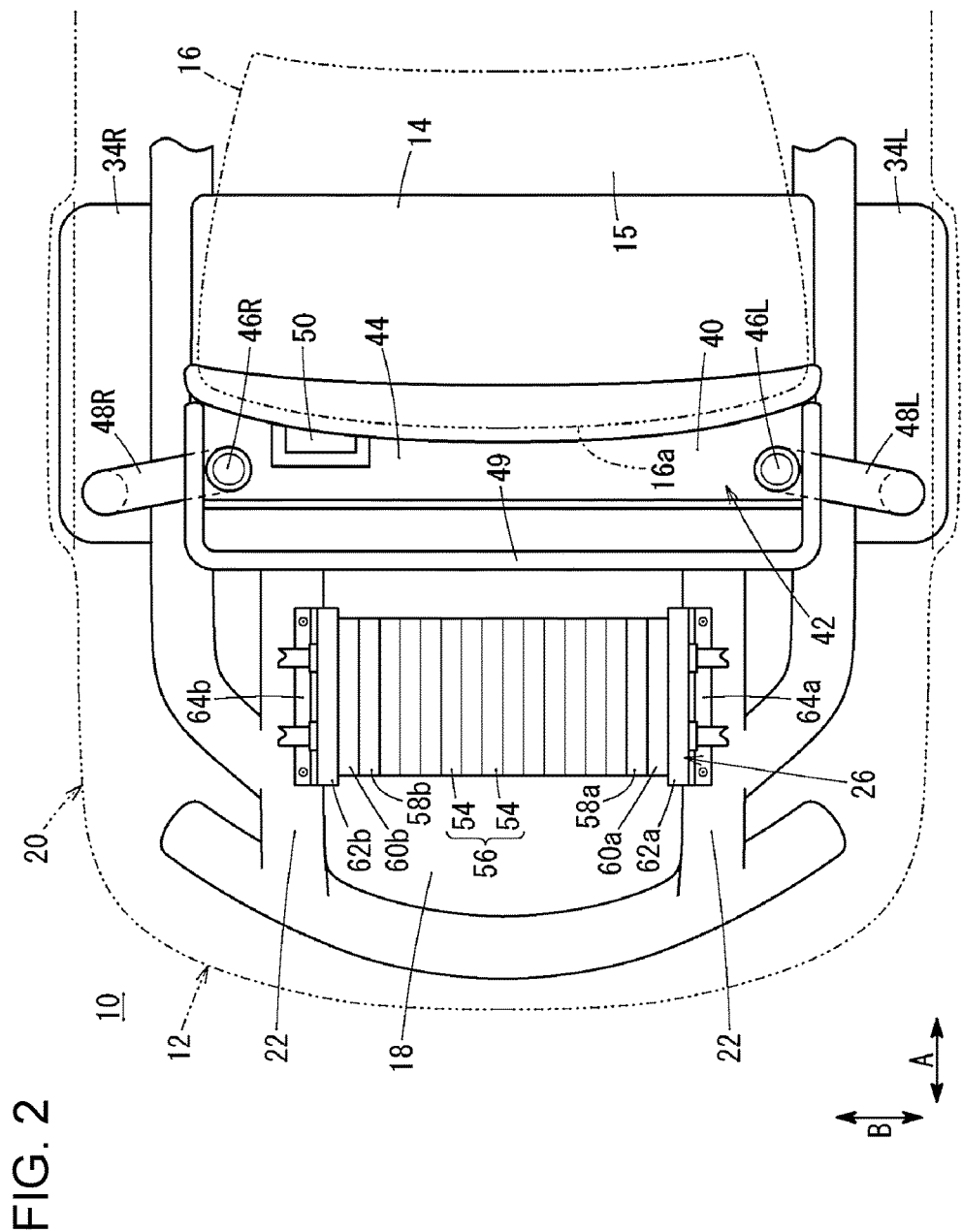
FIG. 2 is a partial schematic plan view of the fuel cell electric automobile.
Figure 3:
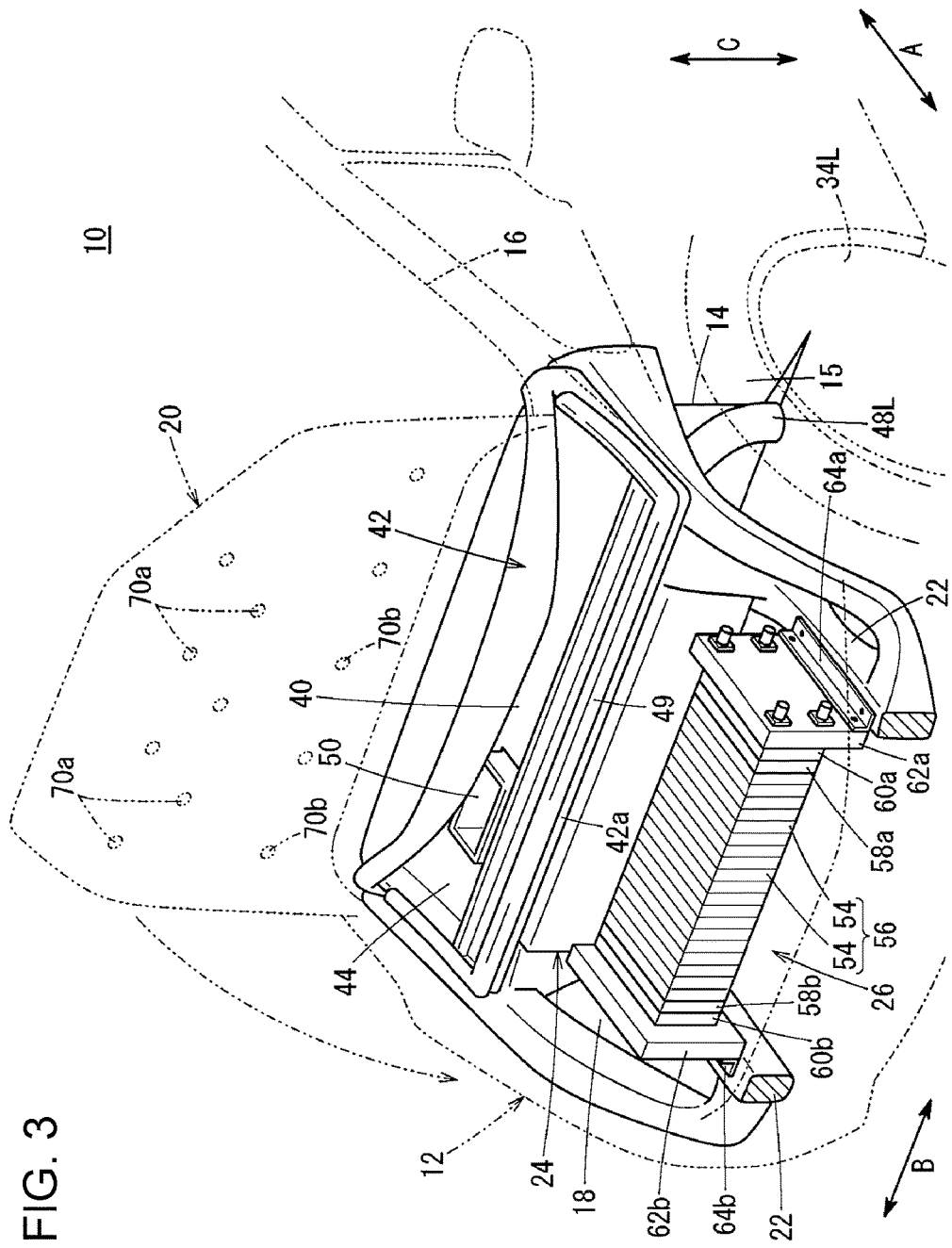
FIG. 3 is a partial schematic perspective view of the fuel cell electric automobile.

As illustrated in FIGS. 1 to 3, a fuel cell electric automobile (fuel cell vehicle) 10 according to a first embodiment of the present disclosure includes an automobile body 12.

The automobile body 12, a dashboard 14, and a windshield 16 form a passenger compartment 15. A front compartment (motor room) 18 is formed in front of the dashboard 14. A front end portion 16a of the windshield 16 is located at an upper front end of the dashboard 14. A hood 20 allows the front compartment 18 to be open to or closed from the outside.

The automobile body 12 includes main frames 22. The main frames 22 extend in the vehicle-length direction (the direction of an arrow A) to a front end of the front compartment 18 and are connected to each other in the vehicle-width direction (the direction of an arrow B in FIGS. 2 and 3). As illustrated in FIG. 1, a subframe 23 is joined to the main frames 22. An air conditioner unit (air conditioner) 24 and a fuel cell unit 26 are attached to the main frames 22.

A drive motor 28 and a steering gear box 30 are attached to the subframe 23. The drive motor 28 is connected to left and right axle shafts 32L and 32R. Wheels 34L and 34R are attached the axle shafts 32L and 32R. The steering gear box 30 is connected to the axle shafts 32L and 32R.

As illustrated in FIGS. 1 and 3, a vent hole 40, extending in the vehicle-width direction, is formed at the upper front end of the dashboard 14. Rainwater flowing down from the windshield 16 passes through the vent hole 40. A cowl top 42, for draining water, is disposed below the front end portion 16a of the windshield 16. The cowl top 42 extends in the vehicle-width direction, and both ends of the cowl top 42 in the vehicle-width direction are fixed to the automobile body 12.

The cowl top 42 has a drain channel 44 therein. The drain channel 44 extends in the vehicle-width direction along a lower part of the windshield 16. As illustrated in FIG. 2, drain holes 46L and 46R are respectively formed in the left and right end portions of the cowl top 42 in the vehicle-width direction. Inlet end portions of drain pipes 48L and 48R are connected to the drain holes 46L and 46R. Outlet end portions of the drain pipes 48L and 48R open to the outside of the front compartment 18.

In the cowl top 42, a sealing member 49 is disposed on an end wall plate 42a on the front compartment 18 side. The sealing member 49, which corresponds to a sealing portion, surrounds an upper end portion of the end wall plate 42a, comes into contact with the inner surface of the hood 20, and hermetically seals the cowl top 42 from an inner space of the front compartment 18.

An air inlet 50 of the air conditioner unit 24 opens to the cowl top 42, for example, at a position near the drain hole 46R. The air inlet 50 opens at a position above the drain holes 46L and 46R. The air conditioner unit 24 is disposed below the cowl top 42. An air outlet 52 of the air conditioner unit 24 is connected to the dashboard 14 and opens to the passenger compartment 15 (see FIG. 1).

As illustrated in FIG. 2, the fuel cell unit 26 includes a fuel cell stack 56, in which a plurality of power generation cells 54 are stacked in the vehicle-width direction (the direction of an arrow B). The stacking direction of the fuel cell unit 26 may be the direction of gravity.

Although not shown in FIG. 2, each power generation cell 54 includes a membrane electrode assembly (MEA) and a pair of separators sandwiching the MEA therebetween. At each of two ends of the power generation cell 54 in the stacking direction, terminal plates 58a and 58b, insulation plates 60a and 60b, and end plates 62a and 62b are disposed.

One end of each of angular members 64a and 64b, having L-shaped cross sections, is fixed to a corresponding one of the end plates 62a and 62b. The other end of each of the angular members 64a and 64b is fixed to a corresponding one of the main frames 22. Thus, the fuel cell unit 26 is attached to the main frames 22.

As illustrated in FIG. 1, the hood 20 includes an outer plate member (outer plate, exterior member) 66a and an inner plate member (inner plate) 66b that are joined together. The inner plate member 66b may include a plurality of plates. An inner passage 68, which extends from the front compartment 18 to the cowl top 42 beyond the sealing member 49, is formed between the outer plate member 66a and the inner plate member 66b. The sealing member 49 comes into contact with the inner plate member 66b and thereby hermetically seals the front compartment 18 and the cowl top 42 from each other.

Figure 4:
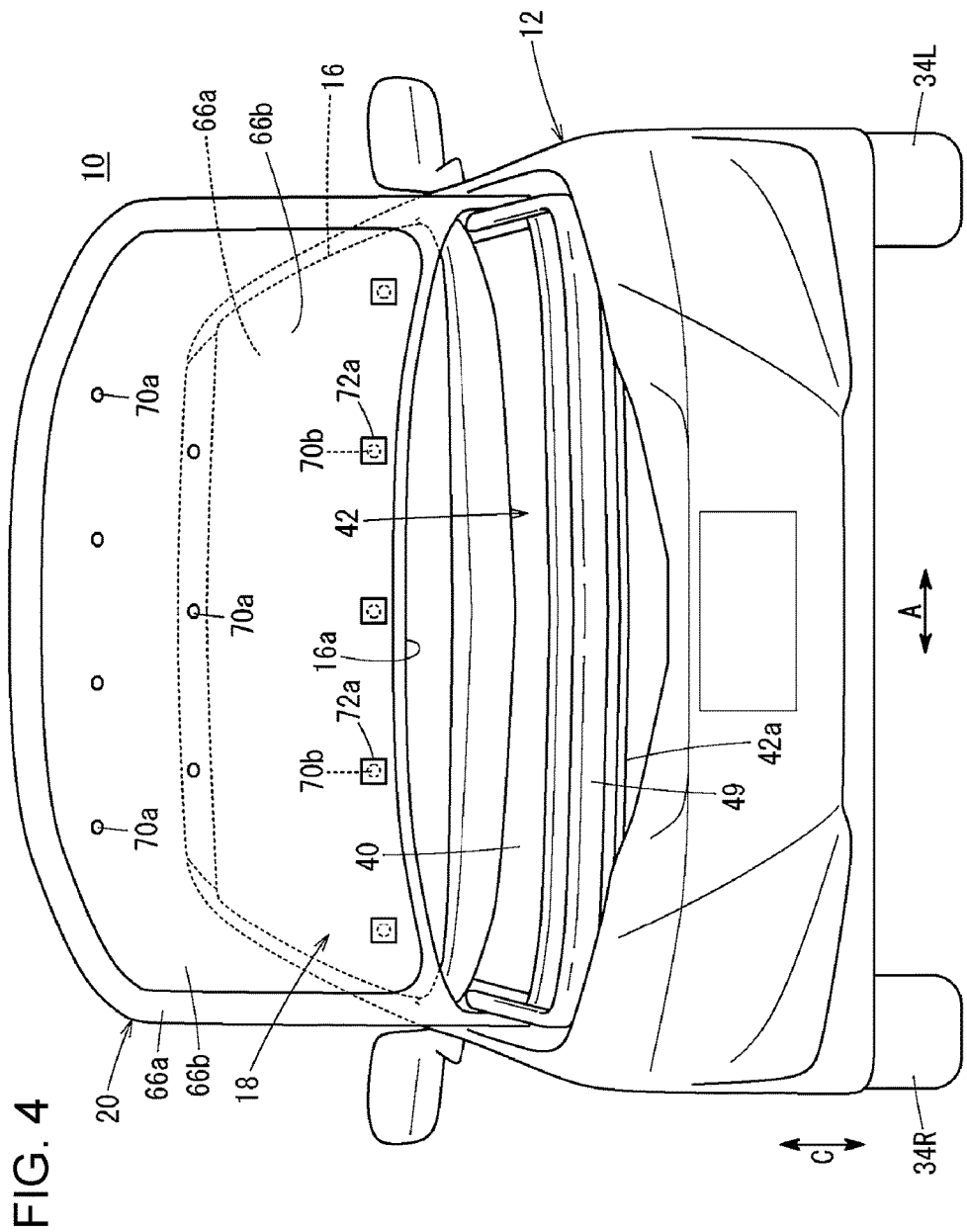
FIG. 4 is a schematic front view of the fuel cell electric automobile, illustrating an inner plate member of a hood of the fuel cell electric automobile.

A blocking member, which blocks flow of hydrogen gas (fluid) that is a fuel gas between the front compartment 18 and the cowl top 42, is disposed in the inner passage 68. To be specific, as illustrated in FIGS. 1 and 4, a plurality of holes 70a and 70b, which are used for positioning when performing press-forming or the like, are formed in the inner plate member 66b.

As illustrated in FIG. 1, the holes 70a open to the front compartment 18, and the holes 70b open to the cowl top 42. The holes 70a and 70b may have various cross-sectional shapes, such as circular shapes, elliptical shapes, slit-like shapes, or polygonal shapes.

In the first embodiment, sealing members 72a, each of which corresponds to a blocking member, are disposed in all of the holes 70b that open to the cowl top 42; and the sealing members 72a close the holes 70b. As illustrated in FIGS. 1 and 4, the sealing members 72a, which are adhesive tapes or seals, hermetically seal the holes 70b from the cowl top 42 by closing the holes 70b.

Figure 5:
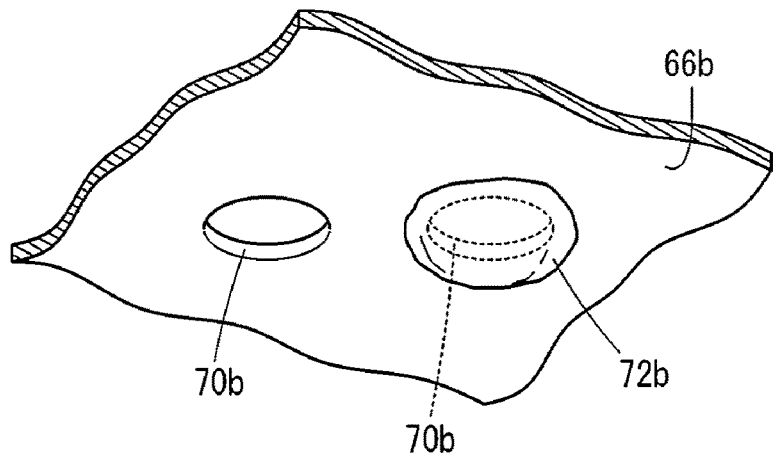
FIG. 5 is a perspective view illustrating a seal disposed on the hood.

As illustrated in FIG. 5, the blocking member may include, instead of the sealing members 72a, sealing members 72b, each made of a sealant adhesive, and may close the holes 70b by using the sealing members 72b.

Figure 6:
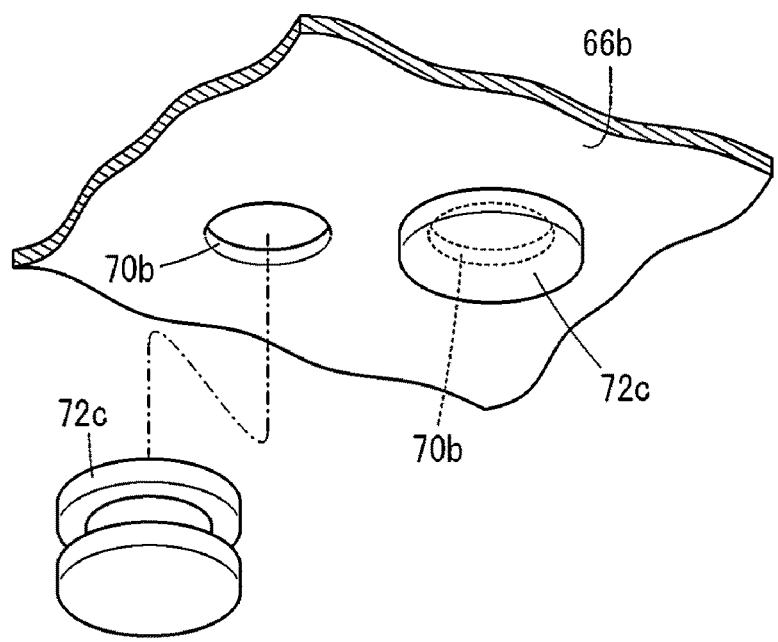
FIG. 6 is a perspective view illustrating a grommet disposed on the hood.

As illustrated in FIG. 6, the blocking member may include, instead of the sealing members 72a, sealing members 72c, each being a grommet, and may close the holes 70b by using the sealing members 72c.

In the first embodiment, the blocking members are disposed in all of the holes 70b that open to the cowl top 42. Alternatively, the blocking members may be disposed in all of the holes 70a that open to the front compartment 18. The blocking members may be disposed in both of the holes 70a and 70b.

An operation of the fuel cell electric automobile 10 having such a structure will be described below.

Referring to FIG. 2, in the fuel cell unit 26, hydrogen gas is supplied as a fuel gas, and air is supplied as an oxidant gas. Thus, electric power is generated by the power generation cells 54, and the electric power is output from the fuel cell units 26 and supplied to, for example, the drive motor 28. Therefore, the fuel cell electric automobile 10 can be driven as the drive motor 28 rotates.

In this case, in the first embodiment, the blocking member, which blocks flow of hydrogen between the front compartment 18 and the cowl top 42, is disposed in the inner passage 68 formed between the outer plate member 66a and the inner plate member 66b of the hood 20.

To be specific, as illustrated in FIGS. 1 and 4, the sealing members 72a, each of which corresponding to a blocking member, are disposed in all of the holes 70b that open to the cowl top 42; and the sealing members 72a seal the holes 70b. As illustrated in FIG. 1, when hydrogen leaks from the fuel cell unit 26 disposed in the front compartment 18, the hydrogen may flow through the holes 70a into the inner passage 68 of the hood 20. In this case, because the holes 70b are sealed by the sealing members 72a, hydrogen flowing through the inner passage 68 can be reliably prevented from flowing into the cowl top 42.

Accordingly, hydrogen is not sucked from the air inlet 50 of the air conditioner unit 24, which opens to the cowl top 42. Thus, the first embodiment has an advantage in that it is possible to prevent hydrogen, leaked from the fuel cell unit 26, from being sucked by the air conditioner unit 24 and flowing into the passenger compartment 15 by using a simple structure.

In the case where, instead of disposing the blocking members in the holes 70b, the blocking members are disposed in all of the holes 70a that open to the front compartment 18, hydrogen leaked from the fuel cell unit 26 does not flow into the inner passage 68 of the hood 20. Therefore, leaked hydrogen in the front compartment 18 can be prevented from flowing into the cowl top 42 through the inner passage 68 of the hood 20, and the hydrogen can be prevented from flowing into the passenger compartment 15.

Figure 7:
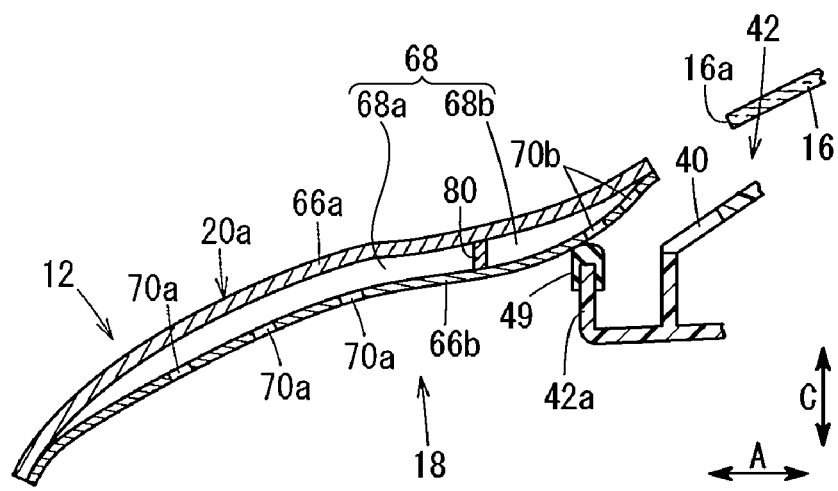
FIG. 7 is a schematic sectional view of a hood of a fuel cell electric automobile according to a second embodiment of the present disclosure.

FIG. 7 is a schematic sectional view of a hood 20a of a fuel cell electric automobile (fuel cell vehicle) according to a second embodiment of the present disclosure. Elements of the hood 20a the same as those of the hood 20a of the fuel cell electric automobile 10 according to the first embodiment will be denoted by the same numerals and detailed descriptions of such elements will be omitted. Likewise, descriptions of such elements will be omitted also in the third embodiment described below.

The hood 20a includes the outer plate member 66a and the inner plate member 66b that are joined together, and the inner passage 68 is formed between the outer plate member 66a and the inner plate member 66b. A blocking plate 80, which corresponds to a blocking member, is disposed in the inner passage 68. The blocking plate 80 hermetically seals a first space region 68a of the inner passage 68, which is connected to the holes 70a, and a second space region 68b of the inner passage 68, which is connected to the holes 70b, from each other.

With the second embodiment having such a structure, even if hydrogen, leaked into the front compartment 18, flows through the holes 70a into the first space region 68a of the hood 20a, the hydrogen is blocked by the blocking plate 80 and does not flow into the second space region 68b. Therefore, the second embodiment has an advantage the same as that of the first embodiment, in that, for example, hydrogen flowing through the inner passage 68 can be reliably prevented from flowing into the cowl top 42.

Figure 8:
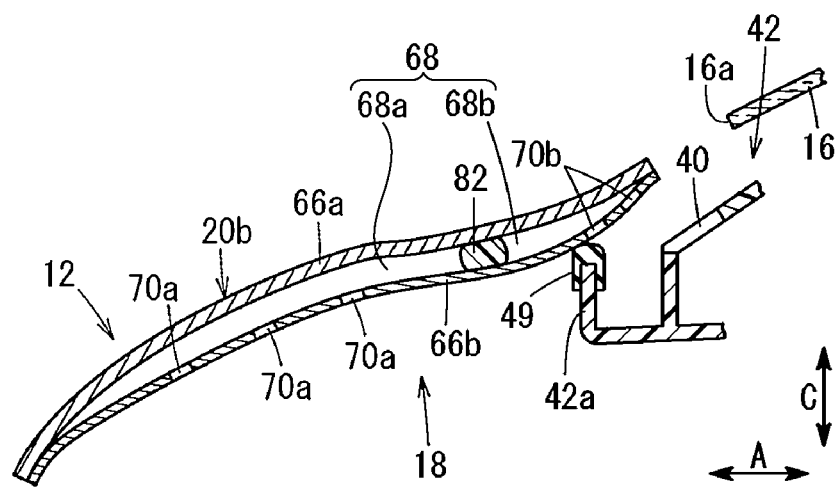
FIG. 8 is a schematic sectional view of a hood of a fuel cell electric automobile according to a third embodiment of the present disclosure.

FIG. 8 is a schematic sectional view of a hood 20b of a fuel cell electric automobile (fuel cell vehicle) according to the third embodiment of the present disclosure.

The hood 20b includes the outer plate member 66a and the inner plate member 66b that are joined together, and the inner passage 68 is formed between the outer plate member 66a and the inner plate member 66b. A filler 82, which corresponds to a blocking member, is disposed in the inner passage 68. The filler 82 hermetically seals the first space region 68a of the inner passage 68, which is connected to the holes 70a, and the second space region 68b of the inner passage 68, which is connected to the holes 70b, from each other.

Thus, the third embodiment has a structure similar to that of the second embodiment. Accordingly, the third embodiment has an advantage the same as that of the first and second embodiment.

The present disclosure relates to a fuel cell vehicle including a fuel cell disposed in a front compartment in front of a dashboard and a cowl top disposed on the front compartment so as to be hermetically sealed from the front compartment with a sealing portion therebetween.

The fuel cell vehicle includes a hood that allows the front compartment to be open or closed, the hood including an outer plate member and an inner plate member that are joined together. An inner passage, which extends from the front compartment to the cowl top beyond the sealing portion, is formed between the outer plate member and the inner plate member. A blocking member, which blocks flow of fluid between the front compartment and the cowl top, is disposed in the inner passage.

In the fuel cell vehicle, preferably, the blocking member is a sealing member that seals a hole formed in the inner plate member.

In the fuel cell vehicle, preferably, the hole sealed by the sealing member is formed in the inner plate member so as to open to the front compartment or to the cowl top.

In the fuel cell vehicle, preferably, the sealing member is one of an adhesive tape, a rubber seal, a grommet and a sealant adhesive.

In the fuel cell vehicle, preferably, the blocking member is a blocking plate that is disposed between the inner plate member and the outer plate member.

In the fuel cell vehicle, preferably, the blocking member is a filler that is disposed between the inner plate member and the outer plate member.

With the present disclosure, the blocking member, which blocks flow of fluid between the front compartment and the cowl top, is disposed in the inner passage, which is formed between the outer plate member and the inner plate member of the hood. Therefore, when hydrogen leaks from the fuel cell disposed in the front compartment, the hydrogen can be reliably prevented from flowing into the cowl top through the inner passage of the hood.

Accordingly, for example, hydrogen is not sucked from an air inlet of an air conditioner unit, which opens to the cowl top. Thus, it is possible to prevent hydrogen, leaked from the fuel cell, from being sucked by the air conditioner unit and flowing into a passenger compartment by using a simple structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell vehicle comprising:
   a fuel cell disposed in a front compartment in front of a dashboard;
   a cowl top disposed on the front compartment so as to be hermetically sealed from the front compartment with a sealing portion therebetween; and
   a hood that allows the front compartment to be open or closed, the hood including an outer plate member and an inner plate member that are joined together,
   wherein an inner passage, which extends from the front compartment to the cowl top beyond the sealing portion, is formed between the outer plate member and the inner plate member,
   wherein a blocking member, which blocks flow of fluid between the front compartment and the cowl top, is disposed in the inner passage, and
   wherein the hood, with the blocking member, does not permit the flow of fluid from the front compartment to the cowl top through the inner passage.

2. The fuel cell vehicle according to claim 1,
   wherein the blocking member is a sealing member that seals a hole formed in the inner plate member.

3. The fuel cell vehicle according to claim 2,
   wherein the hole sealed by the sealing member is formed in the inner plate member so as to open to the front compartment or to the cowl top.

4. The fuel cell vehicle according to claim 2,
wherein the sealing member is one of an adhesive tape, a rubber seal, a grommet and a sealant adhesive.

5. The fuel cell vehicle according to claim 1,
wherein the blocking member is a blocking plate that is disposed between the inner plate member and the outer plate member.

6. The fuel cell vehicle according to claim 1,
wherein the blocking member is a filler that is disposed between the inner plate member and the outer plate member.

7. The fuel cell vehicle according to claim 1,
wherein the sealing portion comes into direct contact with the inner plate member to hermitically seal the cowl top from the front compartment.

8. The fuel cell vehicle according to claim 1,
wherein the inner plate member includes a through-hole formed in the inner plate member, the blocking member being a sealing member disposed in the through-hole to seal the through-hole.

9. A fuel cell vehicle comprising:
a front compartment which is provided in front of a dashboard and in which a fuel cell is disposed;
a cowl top disposed between the front compartment and the dashboard and hermetically sealed from the front compartment via a sealing portion;
a hood via which the front compartment is opened or closed, the hood including an outer plate and an inner plate that are joined together to provide an inner passage between the outer plate and the inner plate, the inner passage extending from the front compartment to the cowl top bypassing the sealing portion; and
a blocking member disposed in the inner passage to block flow of fluid between the front compartment and the cowl top,
wherein the hood, with the blocking member, does not permit the flow of fluid from the front compartment to the cowl top through the inner passage.

10. The fuel cell vehicle according to claim 9,
wherein the blocking member comprises a sealing member that seals a hole provided in the inner plate.

11. The fuel cell vehicle according to claim 10,
wherein the hole sealed by the sealing member is provided in the inner plate so as to open to the front compartment or to the cowl top.

12. The fuel cell vehicle according to claim 10,
wherein the sealing member comprises one of an adhesive tape, a rubber seal, a grommet and a sealant adhesive.

13. The fuel cell vehicle according to claim 9,
wherein the blocking member comprises a blocking plate that is disposed between the inner plate and the outer plate.

14. The fuel cell vehicle according to claim 9,
wherein the blocking member comprises a filler that is disposed between the inner plate and the outer plate.

15. The fuel cell vehicle according to claim 9,
wherein the sealing portion comes into contact with the inner plate so that the cowl top is hermetically sealed from the front compartment.

16. The fuel cell vehicle according to claim 9,
wherein an air inlet of an air conditioner opens to the cowl top, and an air outlet of the air conditioner opens to a passenger compartment.

17. The fuel cell vehicle according to claim 9,
wherein the sealing portion comes into direct contact with the inner plate member to hermitically seal the cowl top from the front compartment.

18. The fuel cell vehicle according to claim 9,
wherein the inner plate member includes a through-hole formed in the inner plate member, the blocking member being a sealing member disposed in the through-hole to seal the through-hole.

19. A fuel cell vehicle comprising:
a fuel cell disposed in a front compartment in front of a dashboard;
a cowl top disposed on the front compartment;
a sealing portion disposed between the cowl top and the front compartment, the sealing portion hermetically sealing the cowl top from the front compartment; and
a hood that allows the front compartment to be open or closed, the hood including an outer plate member and an inner plate member that are joined together,
wherein an inner passage, which extends from the front compartment to the cowl top beyond the sealing portion, is formed between the outer plate member and the inner plate member, and
wherein a blocking member, which blocks flow of fluid between the front compartment and the cowl top, is disposed in the inner passage.

* * * * *